United States Patent [19]

Benetti

[11] Patent Number: 5,538,523
[45] Date of Patent: Jul. 23, 1996

[54] MUSHROOM GROWING METHOD

[76] Inventor: Giulio Benetti, 9177 Currey Rd., Dixon, Calif. 95620

[21] Appl. No.: 312,778
[22] Filed: Sep. 27, 1994
[51] Int. Cl.$^6$ .................................................. A01G 1/04
[52] U.S. Cl. ........................... 47/1.1; 144/336; 144/338; 239/77
[58] Field of Search ............................ 47/1.1, 31, 8, 27, 47/48.5, 57.5, 58; 71/5; 239/77; 144/336, 338, 3 D

[56] References Cited

U.S. PATENT DOCUMENTS

| | | | |
|---|---|---|---|
| 1,833,089 | 11/1931 | Morimoto | 47/1.1 |
| 3,563,461 | 2/1971 | Cole, Jr. | 239/9 |
| 4,127,965 | 12/1978 | Mee | 47/1.1 |
| 4,646,465 | 3/1987 | Fujimoto | 47/1.1 |
| 4,763,440 | 8/1988 | James | 47/2 |
| 4,833,821 | 5/1989 | Tan | 47/1.1 |
| 4,918,859 | 4/1990 | Shevlin | 47/1.1 |
| 5,001,858 | 3/1991 | Frazar | 47/8 |
| 5,222,665 | 6/1993 | Hill | 239/77 |

FOREIGN PATENT DOCUMENTS 0272214  10/1989  Germany .................................. 47/1.1

OTHER PUBLICATIONS

Chang, et al., ed. 1978, "The Biology and Cultivation of Edible Mushrooms", Academic Press, New York, pp. 426–435, 463–468, 618–622, 650–657.
Rinaldi, et al., 1974, "The Complete Book of Mushrooms", Crown Publishers, Inc., New York, pp. 260, 265, 270–271.

*Primary Examiner*—Howard J. Locker
*Attorney, Agent, or Firm*—Thomas R. Lampe

[57] ABSTRACT

A method of growing mushrooms in which at least one live tree is cut to form a living bottom tree portion having a mushroom growing surface. The live bottom tree portion is inoculated with mushroom spawn and watered to promote decay of the live bottom tree portion at the mushroom growing surface and promote the growing of mushrooms from the mushroom spawn at the mushroom growing surface.

8 Claims, 6 Drawing Sheets

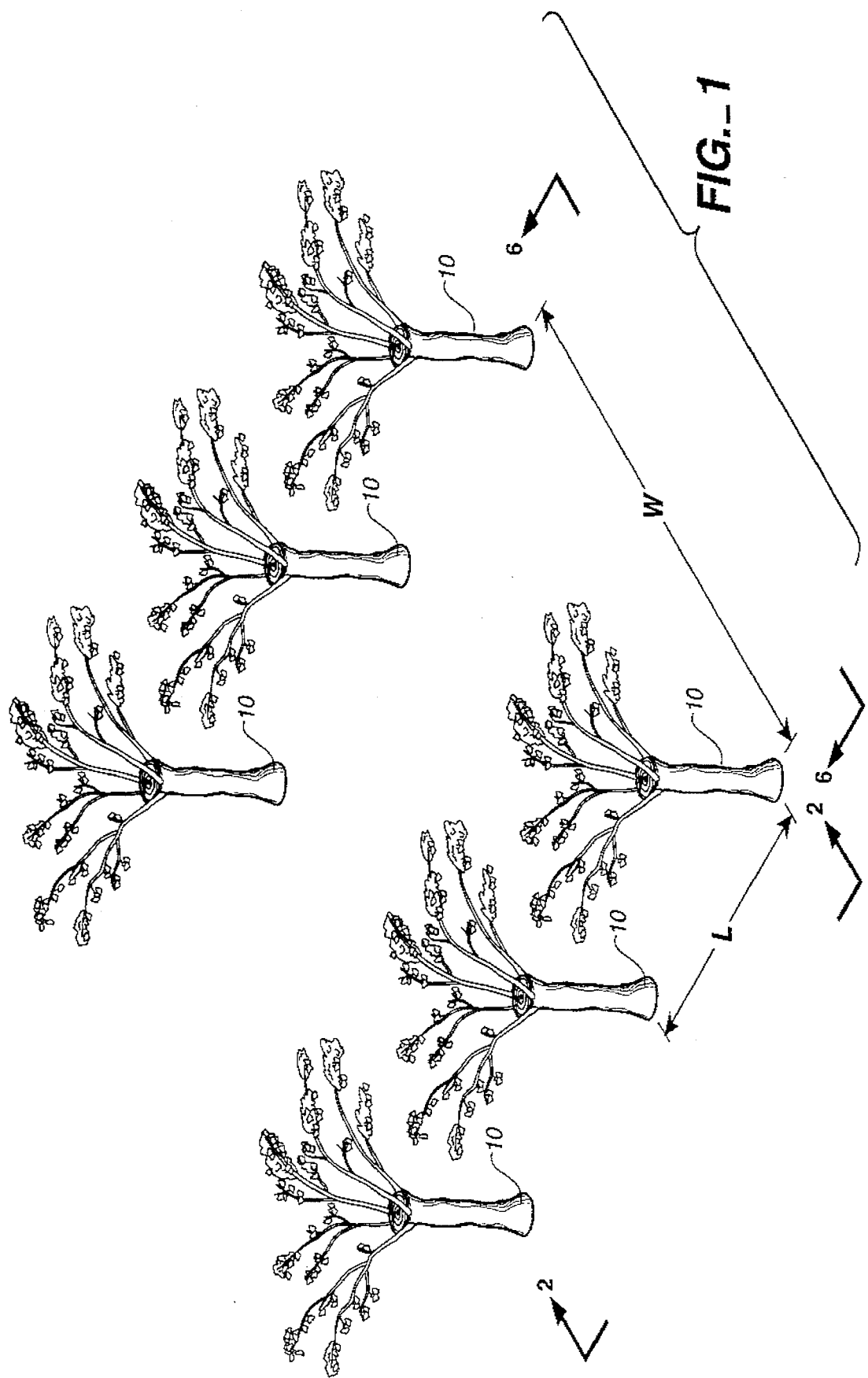
FIG._1

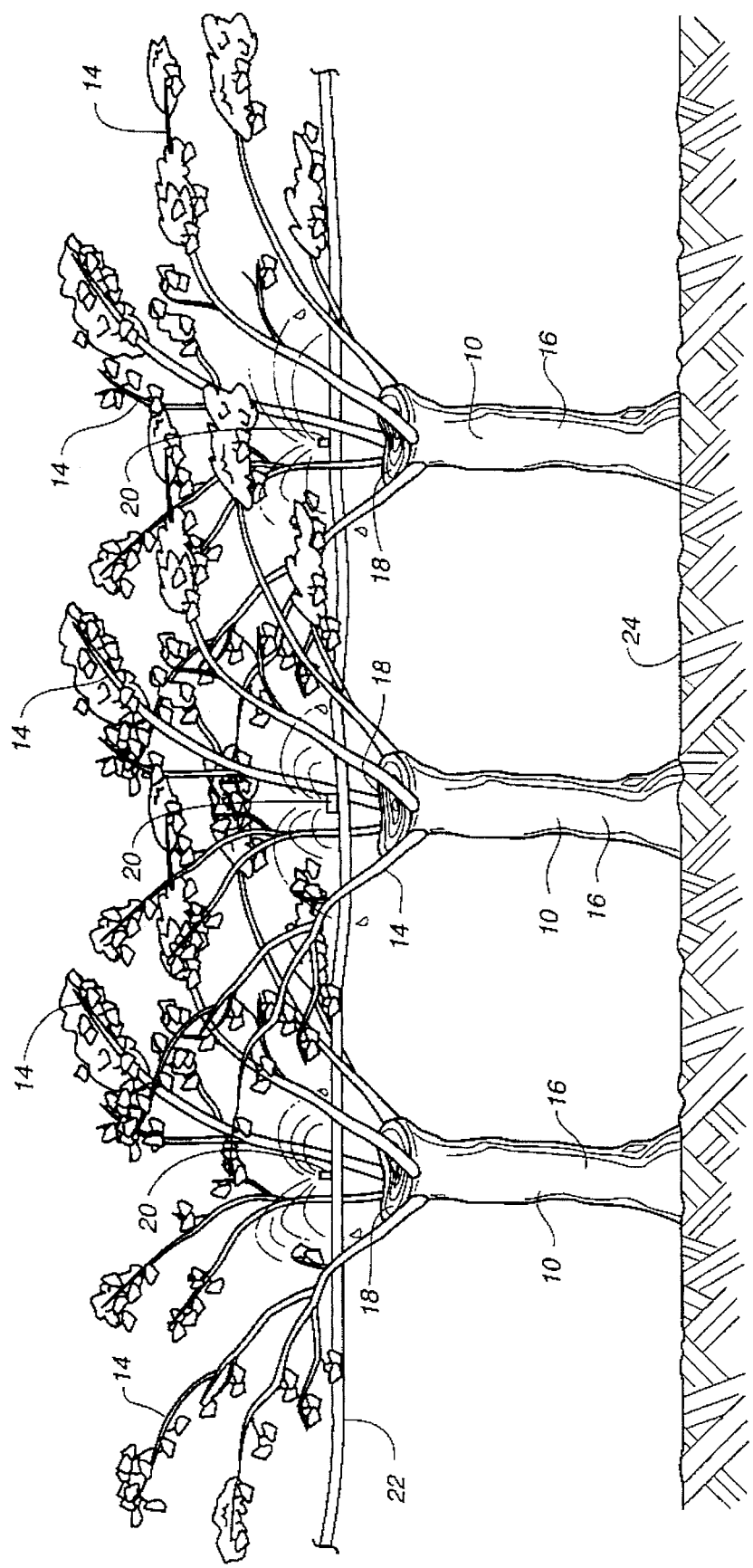

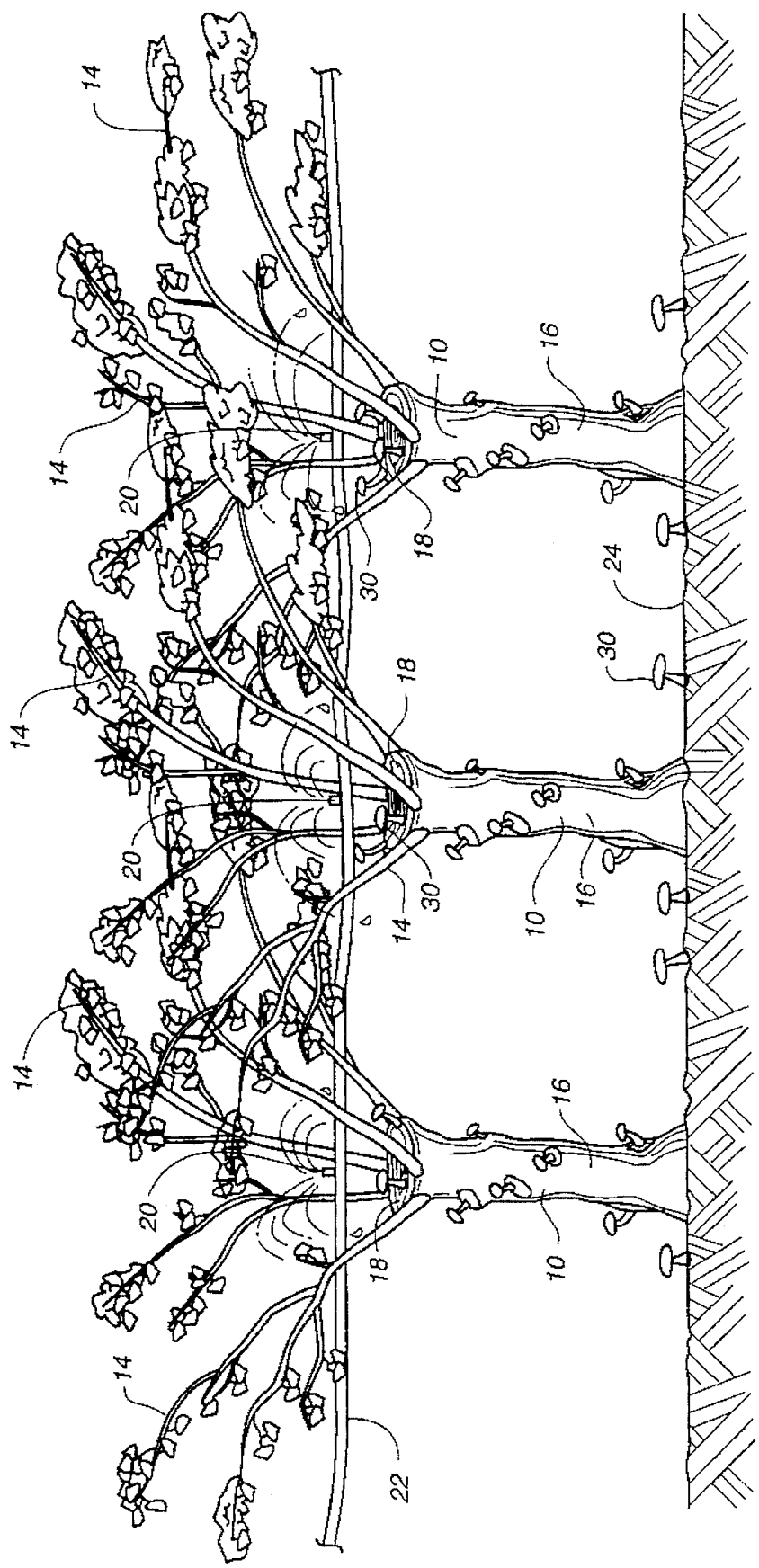
FIG._3

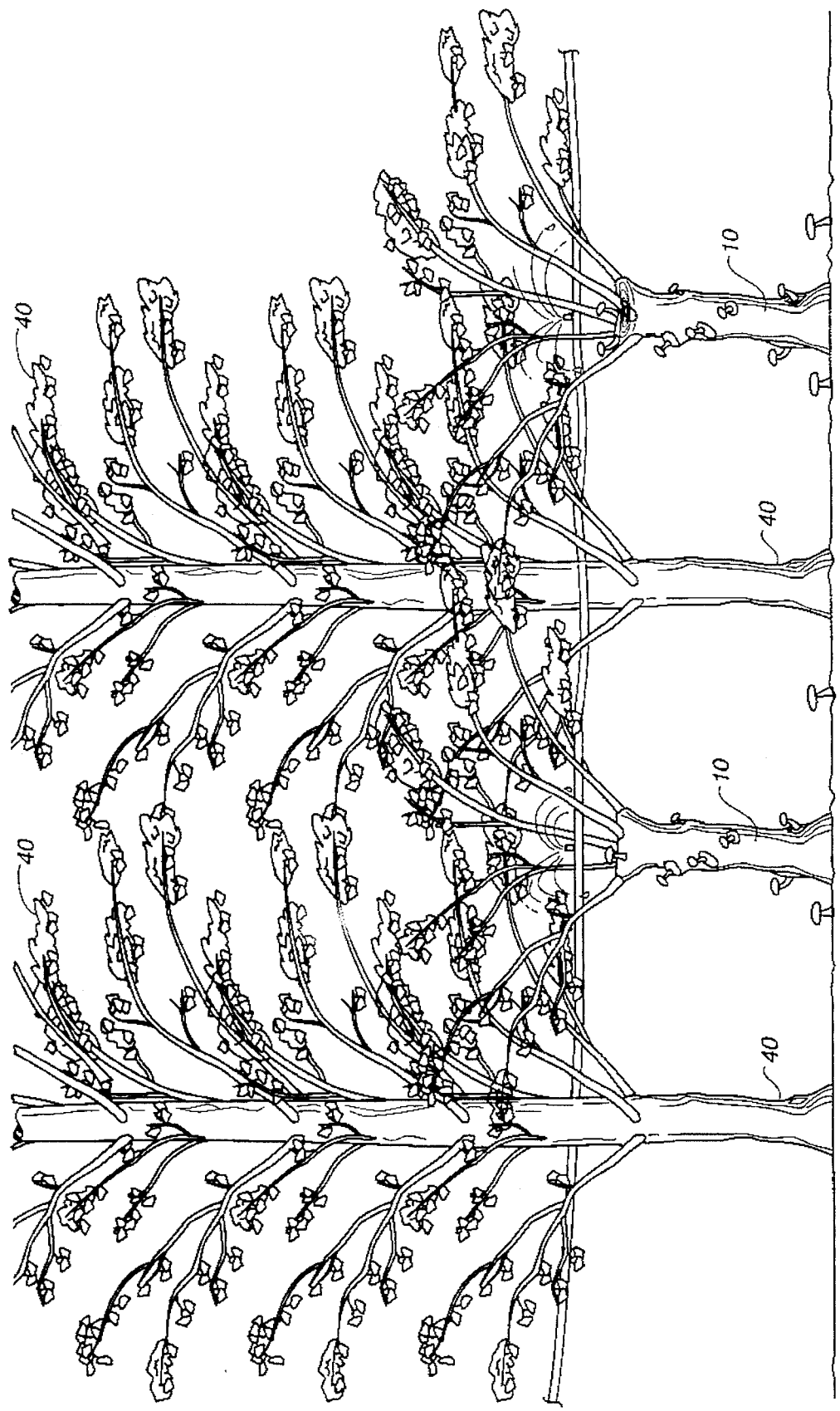
FIG._4

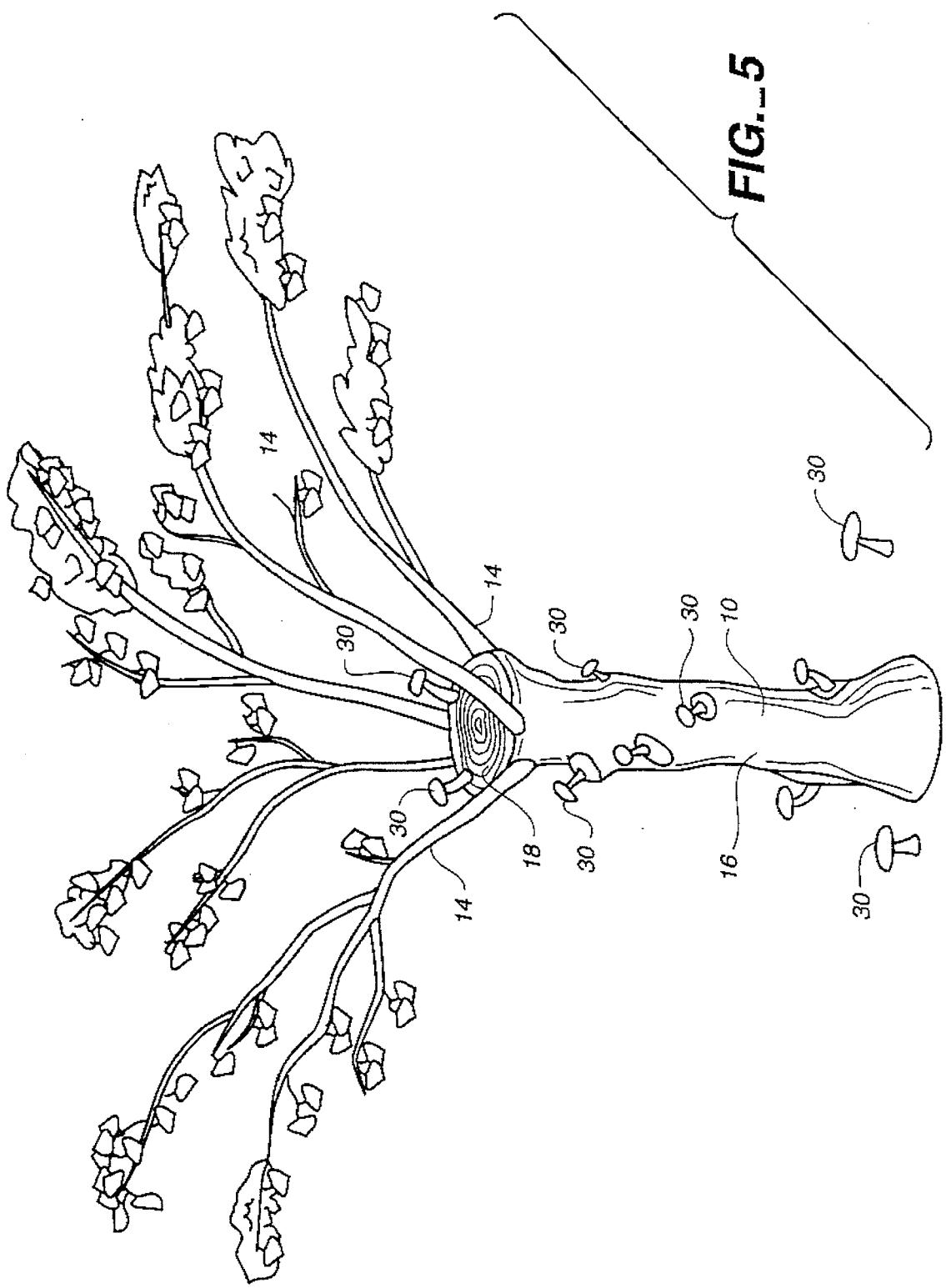
FIG._5

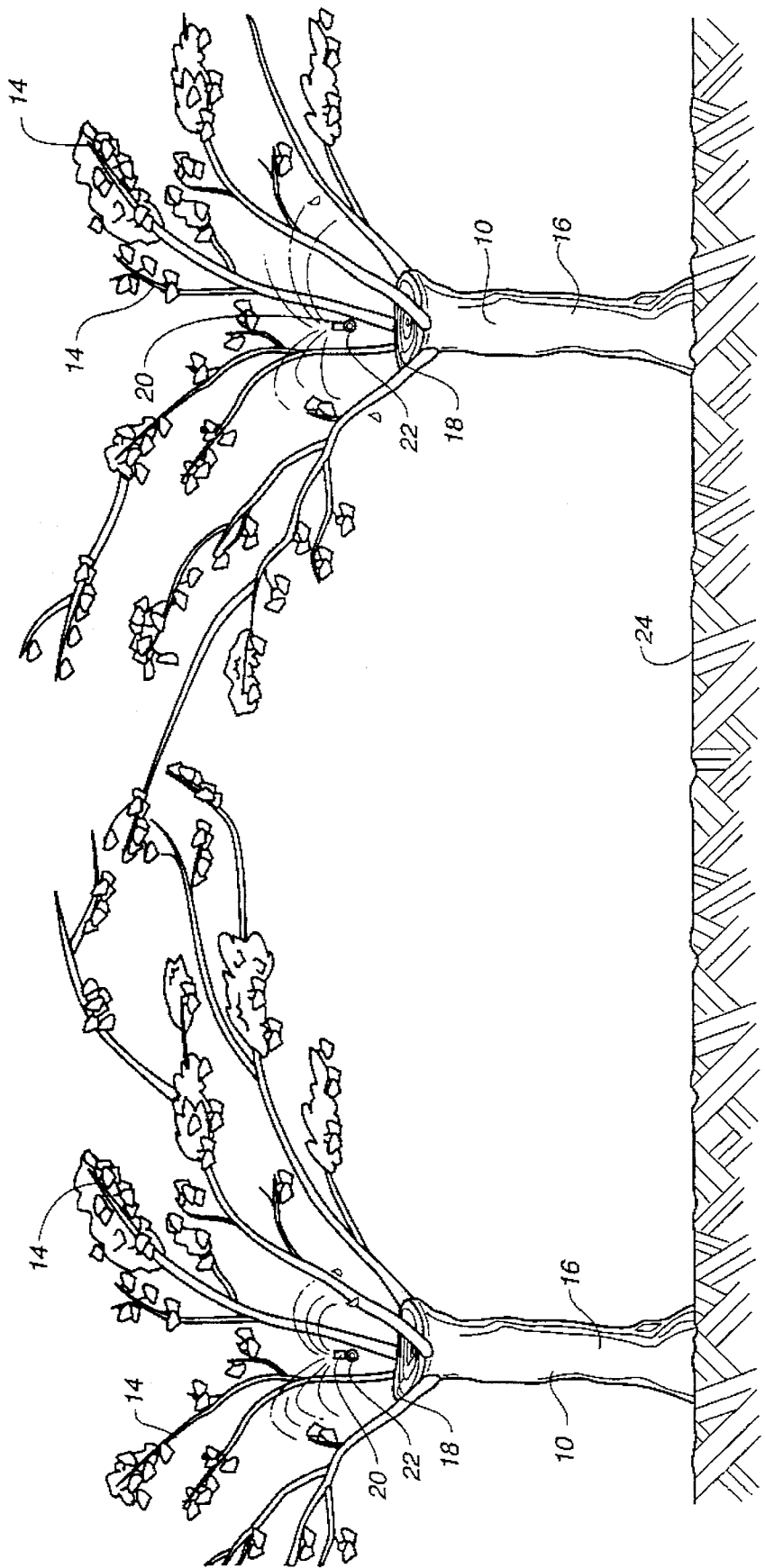
FIG._6

5,538,523

MUSHROOM GROWING METHOD

TECHNICAL FIELD

This invention relates to a method of growing mushrooms and, more particularly, to a method of cultivating and growing mushrooms on and about living trees.

BACKGROUND ART

It is well known in the art to grow mushrooms in host wood. Conventionally, this is accomplished by employing wood logs, wood pieces, and even wood in particulate form as the host or growing medium, the wood having been previously removed from a tree and maintained in a controlled environment conducive to mushroom growing.

Such prior art approaches are quite expensive and often do not lend themselves to large scale mushroom production. The following U.S. patents have been located and are believed to be representative of the current state of the prior art: U.S. Pat. No. 3,563,461, issued Feb. 16, 1971, U.S. Pat. No. 4,833,821, issued May 30, 1989, U.S. Pat. No. 4,918,859, issued Apr. 24, 1990, U.S. Pat. No. 1,833,089, issued Nov. 24, 1931, U.S. Pat. No. 4,763,440, issued Aug. 16, 1988, U.S. Pat. No. 4,646,465, issued Mar. 3, 1987, U.S. Pat. No. 5,001,858, issued Mar. 26, 1991, and U.S. Pat. No. 5,222,665, issued Jun. 29, 1993.

DISCLOSURE OF INVENTION

In contrast to the teachings of the known conventional prior art, the present invention provides for the cultivation and growth of mushrooms in the field. With the method of the present invention a wide variety of mushrooms can be grown, not only mushrooms of the type which grow on a lignocellulose medium but also those which thrive primarily on the ground.

The method of the present invention includes the step of cutting at least one live tree at a selected location above the ground to sever a top tree portion from a bottom tree portion to form a mushroom growing surface on the bottom tree portion positioned above the ground at the selected location.

The bottom tree portion is maintained in a live condition after the cutting step.

The live bottom tree portion is inoculated with mushroom spawn at the mushroom growing surface thereof. The mushroom growing surface is watered to promote decay of the live bottom tree portion at the mushroom growing surface and to promote the growth of mushrooms from the mushroom spawn at the mushroom growing surface.

The at least one live tree includes a trunk and branches branching outwardly from the trunk. The cutting step comprises severing the trunk to form an upwardly directed mushroom growing surface on the trunk above the locations of joinder of a plurality of branches to the trunk whereby the live bottom tree portion comprises a separate trunk and the plurality of branches.

The plurality of branches are grown upwardly and outwardly away from the severed trunk of the live bottom tree portion after the cutting step.

The step of growing the plurality of branches upwardly and outwardly away from the severed trunk of the live bottom tree portion brings the plurality of branches into engagement with branches of at least one adjacent live tree to form a branch canopy over the ground therebetween to shade the ground and promote the retention of ground moisture.

Other features, advantages, and objects of the present invention will become apparent with reference to the following description and accompanying drawings.

BRIEF DESCRIPTION OF DRAWINGS

FIG. 1 is a perspective view of a plurality of live trees disposed in rows and each comprising a bottom tree portion having a mushroom growing surface and a plurality of branches;

FIG. 2 is an elevation view taken in the direction of arrow 2—2 in FIG. 1 illustrating three live bottom tree portions with the mushroom growing surfaces thereof being watered and illustrating branches thereof forming a branch canopy to shade the ground and promote moisture retention;

FIG. 3 is a view similar to FIG. 2, but illustrating mushrooms growing from the bottom tree portions and on the ground shaded by the branch canopy;

FIG. 4 is an elevational view showing four live trees, two of which have been treated in accordance with the teachings of the present invention and two of which are in their normal state;

FIG. 5 is a frontal, perspective view illustrating a bottom tree portion having mushrooms growing on the upwardly directed mushroom growing surface thereof, on the periphery of the tree trunk, and on the surrounding ground; and FIG. 6 is an elevation view taken in the direction of arrow 6—6 in FIG. 1.

MODES FOR CARRYING OUT THE INVENTION

Referring now to FIGS. 12, 3, and 6, a plurality of live tree bottom portions 10 are illustrated. Tree bottom portions 10 are spaced from one another and disposed in rows.

For purposes of illustration, the tree bottom portions 10 are formed from *Poplar nigra* 'Italica' trees (*Populus nigra* 'Italica'); however, it is to be understood that the teachings of the present invention may be applied to other tree varieties such as other trees of the genus Populus, including cottonwood trees.

The bottom tree portions are, as previously stated, disposed in rows in the illustrated arrangement and severing or cutting of the trees to form the bottom tree portions takes place after planting of the trees and growth thereof to a desired size. Any suitable means, such as a chain saw (not shown) may be utilized to separate the top tree portions (not shown) from the bottom tree portions. In accordance with the teachings of the present invention, cutting of each top tree portion from the bottom tree portion preferably takes place at a location in the order of five or six feet above the ground. Furthermore, cutting of the tree takes place above the locations of joinder of a plurality of branches to the trunk whereby the live bottom tree portion comprises a severed trunk and the plurality of branches. Typically, the branches 14 remaining with the trunk 16 of each bottom tree portion after severing will number in the order of about four to six.

Cutting of each tree to sever a top tree portion from a bottom tree portion will form a generally planar, upwardly directed mushroom growing surface 18 at the top or crown of the bottom tree portion. That is, the surface 18 will be in the form of raw wood after the cut and will comprise the medium for cultivation and growth of mushrooms.

It is important, however, that the mushroom growing surface 18 be in a suitable state of decay to permit the proper growing of mushrooms. Decay is promoted by watering the mushroom growing surface. In FIGS. 2 and 6, for example, this is shown being accomplished by upwardly directed sprinklers 20 disposed in any suitable manner above the mushroom growing surfaces of the bottom tree portions. In the arrangement illustrated in FIGS. 2 and 6, the sprinklers 20 are connected to a common water line 22 which in turn is connected to a source of pressurized water (not shown). The sprinklers 20 not only serve to maintain the mushroom growing surfaces 18 moist, but also preferably have a sprinkling range which provides for the application of water to the ground 24 surrounding the bottom tree portions. FIGS. 2 and 6 show the bottom tree portions preparatory to actual growth of mushrooms thereon.

According to the teachings of the present invention, the live bottom tree portions 10 are inoculated with mushroom spawn at the mushroom growing surface 18. Additional inoculations can take place at locations about the periphery of the trunks 16. Any standard inoculation techniques well known in the art of mushroom cultivation and growing can be utilized for such purpose, and in the interest of simplicity, such procedure will not be described in detail. Likewise, mushroom spawn may be injected into the ground surrounding the bottom tree portions. It is to be appreciated that different types of mushrooms are suitable for growth on lignocellulose or wood while others are suitable for growth on the ground. Among the former are the *pholiota aegerita* and *pleurotus ostreatus* and among the latter are the *stropharia ferrii*, and *pleurotus eryngii*.

An important aspect of the present invention resides in the fact that branches 14 on the severed trunk 16 continue to grow after severing of the top tree portion from the bottom tree portion and thus expand upwardly and outwardly away from the severed trunk of the live bottom tree portion after the cutting step. Such branch growth causes the branches of the live bottom tree portions to engage and intermingle with the branches of adjacent live bottom tree portions, as shown for example in FIGS. 2 and 3. This intermingling results in the formation of a branch canopy over the ground between the live bottom tree portions. The branch canopy shades the ground between the trees and promotes the retention of moisture in the ground.

FIGS. 3 and 5 illustrate mushrooms 30 which have formed on the mushroom growing surface and periphery of the bottom tree portions as well as on the ground 24. It will be appreciated that leaves falling from the branch canopy over time will serve to build up a layer of organic matter on the ground which will promote and encourage mushroom growth.

It is important that the mushroom growing media or host material, including the mushroom growing surfaces 18 and ground 24, be continuously maintained in a moist condition for a prolonged period of time to provide for mushroom growth. That is, the growing media should be maintained in a moist condition as long as mushroom growth is desired and operation of the sprinkler system can be readily controlled either manually or by conventional sprinkler timing equipment to accomplish this.

Placement of live bottom tree portions can be varied dependent upon the character of the tree and other possible factors For example, in the case of the *poplar nigra* 'Italica', and making reference to FIG. 1, the distance L may be six feet and the distance W twelve feet. Preferably, the fully formed branch canopy is between adjacent bottom tree portions in both row directions, that is, an essentially continuous canopy over the complete field of trees can be formed.

Referring now to FIG. 4, another possible tree configuration when practicing the teachings of the present invention is illustrated. In this embodiment, every other tree in a row of trees is cut and treated in the manner discussed above. FIG. 4 shows two uncut trees 40 and the bottom tree portions 10 of two formerly cut trees. It will be appreciated that growth of the branches of the bottom tree portions will engage with the branches of the uncut trees to form a canopy. In this arrangement, sprinklers are shown associated only with the bottom tree portions 10 and not with the uncut trees, although the uncut trees can be utilized as illustrated to support the water supply line for the sprinklers.

FIG. 5 illustrates a single bottom tree portion 10 which has been formed and treated in accordance with the present method to grow mushrooms thereon and on the surrounding ground.

We claim:

1. A method of growing mushrooms comprising the steps of:

planting a plurality of trees in the ground at predetermined spaced positions;

growing said plurality of trees at said predetermined spaced positions, each said tree being a live tree including a trunk and branches extending from said trunk above the ground;

cutting the trunk of each said live tree in a direction transverse to the primary axis of the trunk at a selected location above the ground and above the locations of joinder of a plurality of said branches to said trunk to sever a top tree portion from the live bottom tree portion to form an upwardly directed mushroom growing surface on the live bottom tree portion positioned above the ground at said selected location, said live bottom tree portion comprising a severed trunk terminating at said upwardly directed mushroom growing surface and said plurality of branches radiating outwardly from said severed trunk;

inoculating each live bottom tree portion with mushroom spawn at the upwardly directed mushroom growing surface thereof;

watering said upwardly directed mushroom growing surface of each said live bottom tree portion to promote decay of each live bottom tree portion at the upwardly directed mushroom growing surface thereof and to promote the growth of mushrooms from the mushroom spawn at the upwardly directed mushroom growing surface thereof; and growing said plurality of branches of each live bottom tree portion upwardly and outwardly away from the severed trunk of said live bottom tree portion after said cutting step to bring said plurality of branches of each live bottom tree portion into engagement with branches of at least one adjacent live bottom tree portion to form a branch canopy over the ground therebetween to shade the ground and promote the retention of moisture in the ground.

2. The method according to claim 1 including the step of disposing sprinklers above said live bottom tree portions, said watering step including directing water on to said upwardly directed mushroom growing surfaces of said live bottom tree portions from said sprinklers.

3. The method according to claim 1 including the additional step of inoculating the trunks of said live bottom tree portions at locations on the peripheries of the trunks below the level of the upwardly directed mushroom growing surfaces thereof.

4. The method according to claim 1 wherein said watering step includes applying water to the ground under said branch canopy.

5. The method according to claim 1 wherein said selected location is at least about five feet above the ground.

6. The method according to claim 1 wherein the live trees are of the genus Populus.

7. The method according to claim 1 wherein the live trees are *Populus nigra* 'Italica'.

8. The method according to claim 1 wherein the live trees are cottonwood trees.

* * * * *